though such added adjuncts are permissible. A comparative showing of the wet abrasion resistance, resistance to damage by drycleaning, and resistance to damage while being flexed at low temperatures and similar properties can be readily achieved.

3,681,108
METHOD OF COATING A FABRIC OR TEXTILE WITH COPOLYMERS OF MONOUNSATURATED OR DIUNSATURATED POLYESTERS WITH VINYL MONOMERS

Sheldon N. Lewis, Willow Grove, and John J. Miller, Warminster, Pa., assignors to Rohm and Haas Company, Philadelphia, Pa.
No Drawing. Filed Mar. 10, 1970, Ser. No. 18,290
Int. Cl. B44c 1/08; B44d 1/09
U.S. Cl. 117—33                                    8 Claims

ABSTRACT OF THE DISCLOSURE

The invention provides new copolymers of (I) monounsaturated or diunsaturated addition polymerizable polyester monomers and (II) vinyl monomers. The resulting copolymer is considered to be a vinyl polymer (e.g., an acrylic polymer) containing a pendant polyester plasticizer as an integral part of the polymer. It is not essential that the copolymer be crosslinked or thermoset, and yet the plasticizer is a permanent part of the polymer—not subject to being leached out of the polymer, as is the case with an external plasticizer. While thermosetting or crosslinked compositions are known which bind external plasticizers to the substrate, the very object of attaining flexibility is to a large extent defeated by the binding agent itself when present in large amounts. Also provided are new monomers in the form of unsaturated polyesters having one or two double bonds per molecule. Textile articles characterized by improved water-resistance, wet abrasion or crock resistance, softness of hand, wet and dry peel strengths, washfastness, drycleanability and higher flock density are obtained by following the invention. One of the important advantageous properties of the polymer of the invention is the cold flexing strength of products such as flocked fabrics made therewith.

---

This invention relates to novel solutions, aqueous dispersions and nonaqueous dispersions of polymers useful, for example, in producing bonded, coated, impregnated, or laminated textile articles having improved properties, such as excellent water-resistance, hand, washfastness, cold flexing strength, drycleanability and wet crock or abrasion resistance, new monomers and polymers thereof, to methods for their use and to the articles produced therefrom.

Adhesive, coating, and impregnating compositions based on aqueous dispersion systems, or organic solvent solution systems, are well known. For example, U.S. Pat. 3,249,457 discloses an adhesive composition consisting of an aqueous system based on an acrylic-melamine condensate in combination with an acrylic latex consisting of an aqueous dispersion of a copolymer of methyl methacrylate, methacrylic acid or itaconic acid and ethyl acrylate.

Fabric laminates, flocked fabrics, and bonded nonwoven fabrics or webs are often designed into wearing apparel, and therefore the adhesive compositions used in these articles must possess certain characteristics needed to fit the finished product for the particular end use. An important characteristic required for the adhesive used in most items of apparel is resistance to laundering, so that the article is washfast and resistant to wet abrasion. The prior art has attempted to develop an article having these characteristics, but the results achieved have not been entirely satisfactory. For example, U.S. Pat. 3,249,-457 discloses a flocked article that showed wear after only 1000 rubs when wet abrasion resistance was measured by means of a Crockmeter. These results obtained in the wet crock resistance test were superior to results obtained for flocked articles using other prior art flock adhesives; the latter flocked articles failed after only 125 and 190 rubs. When drycleaned, it is common for plasticizers ultimately to be leached from fabrics; the present invention eliminates this problem by using an internal, i.e., copolymerized polyester plasticizer. Furthermore, the use of thermosetting or crosslinking materials is not necessary to achieve permanent plasticization according to the invention, although such added adjuncts are permissible. A comparative showing of the wet abrasion resistance, resistance to damage by drycleaning, and resistance to damage while being flexed at low temperatures and similar properties can be readily achieved.

Aminoplast resins (thermosetting materials formed by the condensation of formaldehyde with a nitrogen compound and a higher aliphatic alcohol) and an acid catalyst have been considered as a means to attach polyester plasticizers to vinyl polymers, particularly acrylic polymers, but the aminoplasts are inherently inflexible and are used at the cost of softness and flexibility at temperatures of below about 70° F. and particularly at below about 50° F.

The invention provides new vinyl polymers (e.g., an acrylic polymer) containing a pendant polyester plasticizer as an integral and permanent part of the polymer, which are copolymers of (I) monounsaturated or diunsaturated addition polymerizable polyester monomers and (II) vinyl monomers.

Also provided are new monomers in the form of unsaturated polyesters having one or two double bonds per molecule. Textile articles characterized by improved water-resistance, wet abrasion or crock resistance, softness of hand, wet and dry peel strengths, washfastness, drycleanability and higher flock density, are obtained by following the invention.

One of the important advantageous properties of the polymer of the invention is the cold flexing strength of products such as flocked fabrics made therewith. Other coated, bonded, impregnated, and laminated articles are provided, as well as methods of manufacturing the articles.

For the monomer (I), which comprises the interaction product of:

(A)

(1) an addition-polymerizable unsaturated polybasic preferably dibasic carboxylic acid, having a single polymerizable double bond,
(2) a saturated polybasic, preferably dibasic acid or one having no polymerizable double bonds, such as an aliphatic, cycloaliphatic, or aromatic acid, and
(3) a polyol, preferably a diol, and most desirably having no $>C=C<$ unsaturation, i.e., being saturated, and preferably aliphatic or cycloaliphatic, or (B)

(1)(a) an addition-polymerizable alcohol, preferably an aliphatic or cycloaliphatic monohydric monounsaturated alcohol, or (b) a half ester of an addition-polymerizable dibasic acid having one double bond with a saturated monohydric alcohol, or (c) an addition-polymerizable polyol, preferably a diol having a single double bond,
(2) a saturated polybasic, preferably dibasic acid or one having no polymerizable double bonds, such as an aliphatic, cycloaliphatic, or aromatic acid,
(3) a polyol, preferably a diol, and most desirably having no $>C=C<$ unsaturation, i.e., being saturated, and preferably aliphatic or cycloaliphatic, and
(4) optionally, an addition-polymerizable unsaturated polybasic, preferably dibasic carboxylic acid, having a single polymerizable double bond, said monomer (I) having a single polymerizable double bond per molecule or, less preferably, a maximum of two double bonds, there is a wide choice of the reactants (1), (2), (3), and optionally, (4).

The concept is applicable to any flexibilizing monounsaturated or less preferably diunsaturated polyester copolymerized by addition polymerization with any vinyl monomer. As will be apparent, saturated monobasic or polybasic acids, unsaturated dibasic acids, or half esters of unsaturated dibasic acids may be condensed with polyols with the optional inclusion of saturated or unsaturated dihydric or monohydric alcohols, as long as the quota of one, or less preferably two, double bonds per average molecule is met. It is thus seen that the invention is not restricted to polymers (A) or (B) but encompasses the use of any monounsaturated or diunsaturated polyester.

Examples of useful polymerizable unsaturated polybasic, preferably dibasic acids or their anhydrides and having less than about 36 carbon atoms, preferably having less than about 20 carbon atoms, are:

| | |
|---|---|
| maleic | mesaconic |
| methylene glutaric | dilinoleic |
| fumaric | monochloro maleic |
| itaconic | dichloro maleic |
| aconitic | hydromuconic |
| citraconic | glutaconic | or any other addition-polymerizable polybasic acid. Commonly the stereoisomers, maleic acid and fumaric acid are collectively called butenedioic acids.

Representative saturated polybasic acids or aromatic polybasic acids, preferably the dibasic acids, or anhydrides thereof having no polymerizable double bonds are:

| | |
|---|---|
| adipic | malonic |
| sebacic | pimelic |
| suberic | undecanedioic |
| azelaic | terephthalic |
| i-phthalic | naphthalic |
| o-phthalic | diphenyl-o,o'-dicarboxylic |
| succinic | tetrachlorophthalic |
| glutaric | tetrabromophthalic |

1,1,3-trimethyl-5-carboxy-3-(p-carboxyphenyl)indan or any other dibasic acid free of polymerizable (i.e., olefinic) unsaturation, desirably having up to 20 carbon atoms.

Among the diols (or polyols) having no polymerizable double bond useful in preparing monomer (I) are polyols, glycols, or polyalkylene glycols such as:

ethylene glycol
1,3-butyleneglycol
1,4-butyleneglycol
neopentyl glycol
cyclohexanedimethanol
cyclobutanedimethanol
dipropylene glycol
1,5-pentanediol
trimethylolpropane
1,6-hexanediol
pentaerythritol
2,2'-bis(bromomethyl)-1,3-propanediol
dipropylene glycol
2,2-dimethylpropanediol
2-ethyl-2-methylpropanediol
2-butyl-2-ethylpropanediol
diethylene glycol
propylene glycol
tetrapropylene glycol
glycerine and the like, the number of carbon atoms not being critical, with less than or more than 20 carbon atoms being useful.

Of course, a mixture of more than one of the reactants (1), (1), (2), (3), and optionally, (4) is useful in making the polyester monomer (I).

As has been suggested above, allyl or an equivalent monounsaturated monohydric alcohol may be used with, or in place of, the unsaturated polybasic acids or the unsaturated monohydric or polyhydric alcohols mentioned heretofore for preparing monomer (I). Thus, the monounsaturated or diunsaturated polyester monomer (I) may be terminated with a monounsaturated monohydric alcohol having up to about 20 carbon atoms such as butene-1-ol-3, allyl alcohol, pentene-1-ol-3, methallyl alcohol, dodecene-1-ol-12, and the like, terminated with half esters of any of the monounsaturated dibasic acids described above, such as maleic acid or fumaric acid, with alkanols having 1 to 20 carbon atoms such as methanol, butanol, octanol, dodecanol, and the like, terminated with a saturated monohydric alcohol having up to about 20 carbon atoms such as methanol, butanol, dodecapentanol, and the like, or terminated with a saturated or aromatic monobasic acid having up to about 20 carbon atoms such as acetic, propionic, dodecanoic, benzoic, and the like.

As has also been suggested above, unsaturated dihydric alcohols are useful to form unsaturated polyesters with polybasic acids which are not addition polymerizable, a polyol, and if desired, an addition-polymerizable polybasic acid. Suitable unsaturated dihydric alcohols include butene diol, pentene diol, hexadecene diol, or any other addition polymerizable monosaturated polyol, preferably a diol, having from 3 to about 20 carbon atoms.

The meaning to be given the qualification that the monomer (I) has one double bond, or less desirably a maximum of two double bonds, is that the molecules of the monomer (I) are predominantly of the specified number of double bonds, the average number being that specified. The determination of the number of double bonds in the monomer (I) is relatively simple. For example, with (1) a saturated or aromatic dibasic acid not polymerizable by addition polymerization, (2) an unsaturated dibasic acid polymerizable by addition polymerization, and (3) a saturated diol, a knowledge of the relative mole ratios and the acid number of the reaction product gives the desired information. The molecular weight of monomer (I) is also of value in controlling the condensation process in such a way as to give this monomer its desired characteristics.

Monomer (I) is prepared by conventional methods for preparing low molecular weight polyesters. Common methods for reacting the glycol or equivalent polyol, saturated or aromatic dibasic acid, and unsaturated dibasic acid having a polymerizable double bond are useful.

The mole ratio of (1):(2):(3) of polyester (A) or reactants (1):(2):(3):(4) of polyester (B) depends in large part upon the method of preparing the polyester and the desired flexibilizing effect. For polymer (A), by way of example, the ratio of the reactants (1):(2):(3) can be (1 to 2):(1 to 3):(1 to 4), preferably 1:2:3. These ratios can, of course, be varied for example by precondensing some of the saturated or aromatic acids and alcohols before introducing the unsaturated acid and/or alcohol.

The unsaturated monomer (I) of the invention may be copolymerized with substantially any vinyl monomer (II). The term "vinyl monomer" as used herein means a monomer preferably having less than about 20 carbon atoms comprising at least one of the following olefinically unsaturated groups:

vinylidene, $CH_2=C<$,
vinyl, $CH_2=CH-$, and
vinylene (not in an aryl ring), $-CH=CH-$, whether homopolymerizable or not. Examples are the $\alpha,\beta$-ethylenically unsaturated monocarboxylic acids and esters and amides thereof, $\alpha,\beta$-ethylenically unsaturated aldehydes, $\alpha,\beta$-ethylenically unsaturated dicarboxylic acids and esters, amides, half esters, and half amides thereof, $\alpha,\beta$-ethylenically unsaturated nitriles, hydrocarbons such as α-olefins, conjugated diolefins, vinylaryl compounds, vinyl alkyl ethers, vinyl halides, vinylidene halides, vinyl sulfides, vinyl acyloxy compounds (esters of saturated carboxylic acids and ethylenically unsaturated alkanols), vinyl amines and salts thereof, alkenyl guanamines, vinyl ureido monomers, vinyl compounds having heterocyclic nitrogen-containing (HN<) groups, and halogen, hydroxyalkyl, or aminoalkyl substituted derivatives thereof. The methods for the preparation of the aqueous dispersions of vinyl polymers are conventional and form no part of the present invention, and any known method may be used in accordance with the present invention. For examples of well known methods of preparing vinyl polymers, see "Polymer Processes," Schildknecht, Interscience, New York (1956), pp. 111–174. Mixtures of different polymer dispersions are useful, as are aqueous dispersions prepared by first polymerizing in solution in an organic solvent, then dispersing the material in an aqueous medium. Of course the polymers may be prepared by mass or solution polymerization or by other methods.

Specific examples of suitable vinyl monomers (II) which may be copolymerized with the polyester monomer (I) for use according to the invention are acrylic acid, methacrylic acid, itaconic acid, maleic acid, fumaric acid esters and half esters thereof with alkanols having 1 to 20 carbon atoms, such as methanol, ethanol, butanol, pentadecanol and the like, and amides and half amides thereof with ammonia or organic amines, acrolein, methacrolein, acrylonitrile, methacrylonitrile, ethylene, propylene, isobutene, butadiene, isoprene, chloroprene, styrene, vinyltoluene, vinyl methyl ether, vinyl isobutyl ether, vinyl chloride, vinyl bromide vinylidene chloride, vinyl sulfide, vinyl acetate, vinyl propionate, the vinyl pyridines, primary amino compounds such as β-aminoethyl vinyl ether, aminopentyl vinyl ether, secondary amino-containing compounds such as secondary amyl t-butyl aminoethyl methacrylate, tertiary amino-containing compounds such as t-dimethylaminoethyl methacrylate, and the allied amine salts such as the chloride or hydroxide, ureido monomers such as are disclosed in U.S. Pats. Nos. 2,881,155 to Handkins, 3,300,429 to Glavis and Keighly, and 3,356,627 to Scott, examples being β-ureidoethyl acrylate, β-(N,N'-ethyleneureido) ethyl acid maleate, β-ureidoethyl vinyl ether, N-vinyl-N,N'-ethyleneurea, N-vinyloxyethyl-N,N'-ethyleneurea, N - methacrylamidomethyl-N,N'-ethyleneurea, and N-dimethylaminoethyl-N'-vinyl-N,N'-ethyleneurea, 2-(ω-alkenyl)guanamine such as 4-pentenoguanamine, β-hydroxyethyl methacrylate, N - hydroxyethylacrylamide, N - methylolacrylamide, N-methylolmethacrylamide, and N-(dimethylaminoethyl) acrylamide. Homopolymers of monomer (I), copolymers, and graft, block, or segmented polymers are included.

Others include the aminoalkyl vinyl ethers and sulfides, aminoalkyl acrylates and methacrylates, N-aminoalkyl-acrylamides or -methacrylamides, hydroxyalkyl vinyl ethers or sulfides, and hydroxyalkyl acrylates and methacrylates. Specific monomers of this type include β-aminoethyl vinyl ether and sulfide, β-aminoethyl acrylate and methacrylate, N - β - aminoethyl-acrylamide and N-β-aminoethyl-methacrylamide, and β-hydroxypropyl acrylate and methacrylate.

Preferred comonomers (II) for making copolymers of the present invention include acrylic acid, methacrylic acid, the nitriles thereof, the esters thereof with a saturated aliphatic alcohol having 1 to 18 carbon atoms, acrylamide, methacrylamide, the N-methylol derivatives of these amides, itaconic acid, vinyl acetate, vinyl chloride, vinylidene chloride, and vinylaromatic hydrocarbons, especially styrene, and o-, m-, and p-vinyltoluene.

The weight ratio of monomers (I) and (II) incorporated into the copolymers is between .5:99.5 and 40:60, preferably from .5:95 to 20:80. When greater amounts of polyester are used, the excess is physically rather than chemically incorporated in the polymer to provide a leachable plasticizer.

The polyester monomer (I) may be polymerized or copolymerized in bulk, in solution, or by an emulsion as well as by the techniques resulting in nonaqueous dispersions of the polymer. Solution polymerization may be effected in such solvents as xylene, "Cellosolve" acetate, mixtures of aromatic and polar solvents, water, dimethylformamide or other solvents in which the comonomers are suitably soluble. Emulsion polymerization and solution polymerization are preferred.

The polymerization is effected with the aid of a free radical initiator or catalyst, such as an organic or inorganic peroxide catalyst, peroxy catalysts, such as persulfates, and the azo catalysts. From 0.1% to 3% or more of the initiator or catalyst may be used, based on the total weight of the monomers. To provide a high molecular weight, it is preferred to use from 0.1% to 1% of the initiator. Examples of organic peroxide catalysts that may be used include benzoyl peroxide, acetyl peroxide, caproyl peroxide, butyl perbenzoate, and butyl hydroperoxide. Examples of azo catalysts include azodiisobutyronitrile, azodiisobutyramide, dimethyl or diethyl or dibutyl azodiisobutyrate, azobis(α,γ-dimethylvaleronitrile), azobis(α - methylbutyronitrile), azobis(α - methylvaleronitrile), dimethyl or diethyl azobismethylvalerate, and the like.

In the case of emulsion polymerization particularly, a redox system is extremely effective. Here an organic peroxide may be used or an inorganic peroxide such as hydrogen peroxide, ammonium persulfate, sodium persulfate, or potassium persulfate in amounts similar to those stated above. The peroxide catalyst is effectively coupled with a reducing agent such as an alkali metal sulfite, bisulfite, or metabisulfite, or hydrosulfite, or hydrazine. The action of the redox system may be controlled through use of a chain transfer agent or regulator, such as mercaptoethanol or other mercaptan. Such regulator also finds use outside of redox systems with organic or inorganic peroxides and with azo catalysts, such as azodiisobutyronitrile, azodiisobutyramide, or diethyl azodiisobutyrate.

When a solution technique is used, the direct product of the polymerization is a solution of the polymer, or it may be that the polymer is precipitated from the solution, depending upon the particular solvent, the particular monomers and their properties. When the polymers automatically precipitate because of their insolubility in the solution, it is merely necessary to filter the product and wash the polymer in order to isolate it. When the product is a viscous solution of the polymer, it may be precipitated by adding a solvent for the polymerization solvent in which the polymer is insoluble, after which the suspension or slurry may be filtered or decanted and the polymer washed. Alternatively, the solvent may be distilled to leave the polymer. The emulsion, nonaqueous dispersion or the solution of the polymer, of course, can be used as such.

In the case of emulsion polymerization, examples of suitable non-ionic emulsifiers include the higher alkyl phenoxypolyethoxyethanols in which the alkyl group has from 6 to 18 carbon atoms, such as octyl, dodecyl or octadecyl, and there may be from 8 to 50 or more oxyethylene units. Examples of anionic emulsifiers include the higher fatty alcohol sulfates, such as sodium lauryl sulfate; examples of cationic emulsifiers include higher alkyl pyridinium salts such as lauryl pyridinium chloride, (octylbenzyl)-trimethylammonium chloride, and so on.

The aqueous coating compositions formed of the copolymers may be modified by the addition of a small proportion of certain water-soluble or self-dispersible urea-formaldehyde, N,N' - ethyleneurea - formaldehyde, and aminotriazine-formaldehyde condensates as well as an acidic catalyst. Although this is not essential as it is with the use of external polyester plasticizers, and there is some loss of flexibility, for some uses an aminoplast is of benefit. Thus, penta-methylol or hexa-methylol melamine or a methylated penta-methylol or hexa-methylol melamine condensate obtained by etherification with methyl alcohol may be used. The proportion of condensate used is from one-twentieth to one-third of the weight of copolymer. Preferably, the condensate is employed at about 10 to 20% by weight of the copolymer. Note, for example, U.S. Pat. Nos. 3,235,622 to Clemens et al., 3,261,788 to Carter et al., and 3,365,514 to Fisk et al.

The modified coating compositions may simply be obtained by the dissolution of the polyfunctional reagent, such as the formaldehyde condensate, within the aqueous dispersion of the emulsion copolymer prepared as indicated above. In addition, an acidic catalyst is preferably also dissolved in the aqueous dispersion of the copolymer and condensate.

Examples of the acid catalysts are oxalic acid, ammonium phosphate, ammonium thiocyanate, boron trifluoride ethyl etherate, hydrochloric or other acid salts of a hydroxyaliphatic amine, including 2-methyl-2-aminopropanol,
2-methyl-2-amino-1,3-propanediol,
tris(hydroxymethyl)aminomethane,
2-phenyl-2-amino-1-propanol,
2-methyl-2-amino-1-pentanol,
2-amino-butanol,
triethanolamine, and
2-amino-2-ethyl-1-butanol, also ammonium chloride, pyridine hydrochloride, and benzyldimethylamine oxalate. The amine salts are water-soluble latent catalysts substantially neutral at ordinary temperature but dissociate into volatile components, one of which is acidic at the elevated temperatures used for baking and curing, so that the catalyst, after exerting its accelerating effect, is automatically discharged during the heating or curing stage.

In addition to the other ingredients, aqueous dispersions of the polymers of the present invention may contain a water-soluble thickening agent, such as gum tragacanth, water-soluble cellulose ethers, polyvinyl alcohol or partially saponified polyvinyl acetate, or copolymers of 30 to 60% of acrylic or methacrylic acid with 70 to 40% of ethyl or methyl acrylate. The aqueous dispersions may contain a mild alkali, for example, sodium acetate sodium carbonate, chalk, morpholine, N-methylmorpholine, triethylamine, or ammonia, including, if desired, a mixture of water-soluble substances which form a conventional, mildly alkaline buffer. The proportions of the several ingredients in the aqueous dispersions can be varied widely, and they are adjusted in any convenient manner so that the dispersions or pastes have a consistency suitable for application by the particular technique to be employed for this purpose.

The compositions may be applied to the substrates in any suitable manner such as by spraying, brushing, rollercoating, dipping, knife-coating, and so on. Excess of the applied material may be wiped by any suitable squeegeeing operation such as between pressure rollers, by air squeegeeing, or by a knife or doctor blade. Thereafter, the coating may be dried and cured. Besides simple air-drying, there may be employed for this purpose heated air as in an oven or tunnel drier, radiation such as by infrared lamps, or electrical induction, either of electromagnetic or electrostatic high frequency induction fields. The baking or curing operation may be accomplished by the use of any suitable heating devices such as infrared lamps or electromagnetic or electrostatic high frequency induction devices. The preferred embodiment is the use of the copolymer of monomers (I) and (II) as an adhesive to bond two materials together.

The polymer of the invention may be used in the production of any article, particularly flocked articles. For example, the textile fabric backing of flocked articles is preliminarily coated on one surface with the adhesive polymer of the invention, and then fibrous flock is deposited on the coated backing. The flocked article is then dried and cured at temperatures ranging from about 70° C. to about 150° C.; the curing time and temperature being adapted to the characteristics of the flock material and the backing material.

Ground nylon (40 mesh), viscose rayon (3-den., 0.75 mm.), acrylic fiber, polypropylene (6-den., 1.5 mm.) and other fibrous materials may be used as flock material. The flock material can be readily applied to a backing material which is coated with the adhesive of the invention. Suitable backing materials are cotton duck, spunbonded polyester nonwoven fabric, rayon challis, expanded polyvinyl chloride film, leather, artificial leather and the like.

EXAMPLE 1

Preparation of a propylene glycol/adipic acid/fumaric acid (3/2/1) condensate

In a 1-liter 3-necked flask fitted with mechanical stirrer, nitrogen sparge tube, thermocouple for temperature measurement, and condenser (fitted for steam heating) surmounted by a modified Dean and Stark trap with appropriate reflux condenser are placed 292.0 g. (2.0 moles) of adipic acid, 116.1 g. (1.0 mole) of fumaric acid, and 228.3 g. (3.0 moles) of propylene glycol. The mixture is heated under a nitrogen blanket and occasionally stirred manually until fluid enough to apply mechanical stirring. At a pot temperature of 108° C., the nitrogen sparge tube is immersed and heating continued with mechanical stirring. When a pot temperature of 156° C. is reached, water begins to distill into the Dean and Stark trap. The temperature rises to 199° C. over a 2¼ hour period and after 15 minutes more at this temperature, when 86.5 g. of distillate is collected, the product is recovered. It has an acid number of 109.

EXAMPLE 2

Preparation of a neopentyl glycol, adipic acid and maleic anhydride condensate

Neopentyl glycol (749.6 g., 7.2 moles), adipic acid (701.2 g., 4.8 moles), and maleic anhydride (235.4 g., 2.4 moles) are charged to a 2-liter, 3-necked flask and a stream of nitrogen is passed (50 cc./min.) over the mixture. Heat is applied and when the temperature (in the vicinity of the thermocouple) is about 70° C., careful agitation is begun. After about one hour of heating, when the temperature (pot) is 110° C. and the mixture almost homogeneous, full agitation (175 rev./min.) is applied and the nitrogen sparge tube lowered into the mixture. Thirty minutes later, at a pot temperature of 138° C., water begins to distill into the Dean and Stark trap. During the next 2¼ hours, distillation is continued and the pot temperature rises to 158° C. At this point, when 130.4 g. (75% of theory) of water has been collected, the acid number is determined and found to be 134. During the next three fifteen minute intervals, the acid numbers are found to be 125, 119, and 114. When the latter is reached (145 g. of water had been collected) the mixture (168° C.) is cooled to 120° C. over a period of ten minutes. When 120° C. is reached, the acid number is 109. The distillation assembly is then substituted for the Dean and Stark trap assembly and vacuum cautiously applied. The pressure is lowered, over a 15 minute period to full vacuum (19 mm. Hg). At this point, the nitrogen sparge rate is increased to 800 cc./min. and sparging continued for 5 minutes longer while maintaining a pot temperature of 120° C. The product, a colorless liquid, is collected and allowed to cool to room temperature. The Gardner bubble viscosity is Z6⁻ and the final acid number is 104.

EXAMPLE 3

Typical examples of the polyester prepared similarly to those of Examples 1 and 2, compared with a material outside of the invention, are as follows:

| | Polyester monomer (I) make-up | Mole ratios | Average molecular weight | Average double bonds per molecule |
|---|---|---|---|---|
| (1) | PG/MAn | 1/1 | 864 | 5 |
| (2) | PG/ADA/MAn | 3/2/1 | 546, 1, 174 | 1, 2 |
| (3) | PG/ADA/F | 3/2/1 | 534 | 1 |
| (4) | EG/ADA/MAn | 3/2/1 | 600 | 1 |
| (5) | 1,3 BG/ADA/MAn | 3/2/1 | 672 | 1 |
| (6) | 1,4 BG/ADA/MAn | 3/2/1 | 589 | 1 |
| (7) | NPG/ADA/MAn | 3/2/1 | 694 | 1 |
| (8) | CHDM/Sb/MAn | 3/2/1 | 818 | 1 |
| (9) | G/PA/MAn | 3/2/1 | N.D. | 1 |
| (10)[1] | PE/PA/MAn | 1/3/1 | N.D. | 1 |
| (11) | G/PA/MAn | 1/2/1 | N.D. | 1 |
| (12) | G/PA/MAn | 1/1/2 | N.D. | 2 |
| (13) | PE/PA/MAn | 1/2/2 | N.D. | 2 |
| (14) | NPG/ADA/AL | 2/2/1 | N.D. | 1 |
| (15) | NPG/ADA/Et-MAn | 2/2/1 | N.D. | 1 |
| (16) | NPG/ADA/AL/MAn | 2/1/1/1 | N.D. | 2 |
| (17) | PG/ADA/MAn/Bu | 3/1/1/1 | N.D. | 1 |
| (18) | PG/ADA/MAn/Pr | 2/1/1/1 | N.D. | 1 |

[1] U.S. patent No. 2,609,357.

Abbreviations: PG, propylene glycol; MAn, maleic anhydride; ADA, adipic acid; F, fumaric acid; EG, ethylene glycol; 1,3 BG, 1,3-butylene glycol; 1,4 BG, 1,4-butylene glycol; NPG, neopentyl glycol; CHDM, cyclohexanedimethanol; Sb, sebacic acid; G, glycerol; PE, pentaerythritol; PA, phthalic acid; AL, allyl alcohol; Et-MAn, ethanol monoester of maleic anhydride; Pr, propanol; Bu, butanoic acid; N.D., not determined.

Example 3–(1) gives a product which contains a substantial amount of gel, as is the tendency with those polyesters having two double bonds. The polyesters are copolymerized with vinyl monomers such as ethyl acrylate, butyl acrylate, methyl methacrylate, acrylonitrile, or methacrylic acid for example by conventional emulsion polymerization using gradual addition redox at 60° to 90° C. with ammonium persulfate or t-butyl hydroperoxide catalyzed with ferous sulfate heptahydrate and sodium formaldehyde sulfoxylate. When the latices are spread on cotton duck in a layer 5–10 mils in thickness and mechanically flocked with ground nylon flock, the dried and heat cured product has excellent properties, particularly resistance to leaching during drycleaning and cold flex properties.

EXAMPLE 4

Solution copolymer A

To a 1-liter, 3-necked flask fitted with a stirrer, condenser, thermometer, and thermowatch, and addition funnel are added 300 g. of a 2 to 1 mixture of xylene and methyl Cellosolve acetate. The mixture is heated to 80° with stirring and a solution containing 277.86 g. of methyl methacrylate, 7.14 g. of methacrylic acid 1,5 g. of polyester based on 1,4-butanediol/maleic anhydride/azelaic acid//2/1/1 and 3 g. of a 1% solids solution of AIBN (azodiisobutyronitrile) is added through the addition funnel over a two hour period while the temperature is maintained at 80°. Heating at 80° is continued for 1 hour following complete addition and 0.3 g. of AIBN solution added as a chaser catalyst and the mixture heated for an additional hour. The solution is cooled to 60° and poured into a jar to give a very thick polyester. Solids 40.3%.

EXAMPLE 5

Solution copolymer B

To a 1-liter, 3-necked round bottomed flask fitted with stirrer, condenser, thermometer with thermowatch, and addition funnel was added 300 g. of xylene. The solvent is heated to 112° and a solution of 99.75 g. of methyl methacrylate, 85.5 g. butyl methacrylate, 64.12 g. butyl acrylate, 28.5 g. hydroxypropyl methacrylate, 7.12 g. methacrylic acid, 15 g. of a polyester based on 1,4-butanediol/adipic acid/maleic anhydride//2/1/1 and 4.5 g. of a 1.5% solution of benzoyl peroxide are added with stirring over a two hour period. The temperature is held at 112° during the addition and for one hour afterward when 0.45 g. of 1.5% benzoyl peroxide (BPO) solution is added and the solution kept at 112° for another hour. Another 0.45 g. of BPO chaser catalyst is added, the mixture heated for one hour at 112° and then cooled and bottled. Solids 51.8%.

EXAMPLE 6

Emulsion polymer L

A monomer emulsion is prepared consisting of 789 gms. of ethyl acrylate, 125 gms. of acrylonitrile, 36 gms. of an equal molar ratio of acrylamide and methylolacrylamide, 50 gms. of polyester (Example 3–(7), 71.5 gms. of a 70% solution of t-octylphenoxypoly(40)ethoxyethanol and 430 gms. of deionized water.

A suitable reaction flask, provided with a condenser, stirrer, thermometer, addition funnels, and heating, cooling and nitrogen sparging facilities is charged with 0.75 gm. of sodium lauryl sulfate and 274 gms. of deionized water. A nitrogen sparge is begun on the flask and the contents heated to 53° C. with stirring. The above emulsion is in part added to the flask and the temperature adjusted to 50° C. The polymerization is initiated by adding ammonium persulfate, sodium formaldehyde sulfoxylate, and ferrous sulfate heptahydrate. The temperature rises to about 60° C. at which time the remaining emulsion, ammonium persulfate and a solution of sodium bisulfite are added concurrently in separate streams. The polymerization is continued by conventional methods. The product is cooled to 25° C. and adjusted to pH 5.0 with ammonium hydroxide solution.

EXAMPLE 7

Emulsion copolymer M

A monomer emulsion is prepared consisting of 700 gms. of butyl acrylate, 150 gms. of acrylonitrile, 36 gms. of an equal molar ratio of methacrylamide and methylolmethacrylamide, 50 gms. of polyester (Example 3–(7)), 71.5 gms. of a 70% solution of t-octylphenoxy-poly(40) ethoxyethanol and 430 gms. of deionized water. The emulsion is then polymerized in accordance with the procedure of Example 6.

EXAMPLE 8

Emulsion polymer N

A monomer emulsion is prepared consisting of 320 gms. of butyl acrylate, 62 gms. of acrylonitrile, 18 gms. of an equal molar ratio of methacrylamide and methylolmethacrylamide, 100 gms. of polyester (Example 3–(5)), 35.7 gms. of a 70% solution of t-octylphenoxypoly(40)ethoxyethanol and 215 gms. of deionized water. This is then polymerized in accordance with the procedure of Example 6.

EXAMPLE 9

Emulsion polymer O

A monomer emulsion is prepared consisting of 370 gms. of butyl acrylate, 62 gms. of acrylonitrile, 18 gms. of an equal molar ratio of methacrylamide and methylolmethacrylamide 50 gms. of polyester (Example 3–(2)), 43 gms. of a 70% solution of t-octylphenoxypoly(40)ethoxyethanol and 225 gms. of deionized water. The emulsion is then polymerized using the procedure of Example 6.

EXAMPLE 10

Emulsion polymer P

A monomer emulsion is prepared consisting of 800 gms. of butyl acrylate, 110 gms. of acrylonitrile, 36 gms. of an equal molar ratio of methacrylamide and methylolmethacrylamide, 50 gms. of polyester (Example 3–(7)), 71.5 gms. of a 70% solution of t-octylphenoxy-poly(40) ethoxyethanol and 430 gms. of deionized water. The monomer emulsion is then polymerized as in Example 6.

EXAMPLE 11

Emulsion polymer Q

A monomer emulsion is prepared consisting of 790 gms. of isobutyl acrylate, 124 gms. of acrylonitrile, 36 gms. of an equal molar ratio of methacrylamide and methylolmethacrylamide, 50 gms. of polyester (Example 3–(7)), 71.5 gms. of a 70% solution of t-octylphenoxy-poly(40)ethoxyethanol and 430 gms. of deionized water, which is then polymerized as in Example 6.

EXAMPLE 12

The product of Example 7 is formulated with a thickener and ammonium hydroxide to give a viscosity of ~80,000 cps. (spindle number 4 at 6 r.p.m., Brookfield LUF).

The formulated adhesive is spread on rayon challis by means of a Gardner coating knife with an opening of 0.012 in. Ground nylon flock is then applied immediately by sprinkling it on the adhesive while vibrating the fabric with a beater bar. The beater bar consists of a 1 inch hexagonal bar attached to the shaft of a ¼ H.P. motor that rotates at 1,760 r.p.m. (This beater bar is similar to that described in U.S. Pat. 2,128,811.) After flocking, the fabric is dried for 5 minutes at 200 to 240° F. (usually at 240° F.) and followed by a cure of 5 minutes at 240 to 320° F. (usually at 300° F.).

Portions of the flocked fabrics are tested for durability to washing and drycleaning. A 6 inch x 7 inch sample and a 6 inch x 7 inch sample folded to form a cuff are washed five times in a Maytag home style washer containing 16 gallons of water at 140° F. and ½ cup of Tide and 10 bath towels as ballast. The samples are then examined for loss of flock and edge wear. A 6 inch x 7 inch sample and a 6 inch x 7 inch sample folded to form a cuff are drycleaned five times in a coin-operated drycleaning machine with 8 lbs. of ballast. The samples are then examined for loss of flock and edge wear.

The "hand" of the flocked fabrics is measured before and after washing and drycleaning by measuring 1 inch x 6 inch specimens with the drape-flex stiffness tester.

The products are found to be superior to prior art products in cold flex properties, and drycleanability and launderability.

Latent acid catalysts and acid catalysts and also the addition of melamine resins are also useful. An adhesive viscosity of from ~65,000 cps. to ~100,000 cps. gives good results.

The dispersions and solutions of this invention are useful not only as curable adhesives but also for the deposition of flexible surface-coatings as well as in the coating of rigid materials such as wood and metals. Also, various kinds of paper, such as wrapping paper and wallpaper, are coated and thus protected and decorated. The feel and body of fabrics is improved by impregnation with these materials. Coatings for leather are characterized by excellent appearance and very desirable flexibility at low temperatures. Free films made from the compositions are flexible and strong and are resistant to water and chemicals. Pressure sensitive adhesives containing the polymer of the invention are also useful.

We claim:
1. A method of coating a fabric or textile by applying to the fabric or textile a layer of the composition of a copolymer of:
 (I) an addition-polymerizable polyester having an average of from one to two olefinic double bonds in each molecule and being the condensation product of:
  (A)(1) an addition-polymerizable polybasic carboxylic acid having a single polymerizable double bond and less than 36 carbon atoms,
  (2) a saturated or aromatic polybasic carboxylic acid having no polymerizable double bonds, and
  (B)(1)(a) an addition-polymerizable alcohol, (b) half ester of a saturated alcohol and a dibasic unsaturated acid, or (c) an addition-polymerizable polyol,
  (2) a saturated or aromatic polybasic carboxylic acid having no polymerizable double bonds,
  (3) a polyol, and
  (4) optionally, an addition-polymerizable unsaturated polybasic carboxylic acid,
and
 (II) a vinyl monomer,
and curing the composition.
2. The method of claim 1 in which said copolymer is applied as an aqueous dispersion.
3. The method of claim 1 in which said copolymer is applied as a nonaqueous dispersion in an organic nonsolvent for the polymer.
4. The method of claim 1 in which said copolymer is applied as a solution.
5. The method of claim 1 in which the polyester is (I)(A) and the molar ratio of the reactants (1):(2):(3) is 1 to 2:1 to 3:1 to 4.
6. The method of claim 5 in which the ratio is 1:2:3, the polyol is a diol, and the acids are dibasic.
7. The method of claim 1 in which a flocking material is applied to said layer prior to curing the composition.
8. The method of claim 1 in which said polyester is derived from the condensation of:
 (1) an addition-polymerizable unsaturated dicarboxylic acid,
 (2) a saturated or aromatic dicarboxylic acid, and
 (3) a diol, the mole ratio of the reactants (1):(2):(3) being 1:2:3.

References Cited

UNITED STATES PATENTS

| | | | |
|---|---|---|---|
| 2,345,376 | 3/1944 | Bodle et al. | 117—16 |
| 2,400,487 | 5/1946 | Clark | 117—16 |
| 2,908,028 | 10/1959 | Runton et al. | 117—16 |
| 3,194,702 | 7/1965 | Geller et al. | 117—16 |
| 3,196,133 | 7/1965 | Piloni et al. | 117—161 |
| 3,573,952 | 4/1971 | Berger | 117—16 |
| 3,235,622 | 2/1966 | Clemens | 117—161 X |
| 3,249,457 | 5/1966 | Lynch | 117—161 X |
| 3,261,788 | 7/1966 | Carter et al. | 117—161 X |
| 3,365,514 | 1/1968 | Slover | 117—161 X |

WILLIAM D. MARTIN, Primary Examiner

M. R. P. PERRONE, Jr., Assistant Examiner

U.S. Cl. X.R.

117—16, 142, 155 UA, 161 UC, 161 UT, 161 UZ; 260—29.1 R, 29.6 T, 29.6 NR

UNITED STATES PATENT OFFICE
CERTIFICATE OF CORRECTION

Patent No. 3,681,108          Dated August 1, 1972

Inventor(s) Sheldon N. Lewis and John J. Miller

It is certified that error appears in the above-identified patent and that said Letters Patent are hereby corrected as shown below:

Column 5, line 32, insert a comma after "bromide".

Column 9, line 38, "ferous" should read --ferrous--.

Column 9, line 53, "acid 1,5g. of" should read --acid, 15g. of--.

Column 9, line 54, insert "a" before "polyester".

Column 12, Claim 1 should read:

A method of coating a fabric or textile by applying to the fabric or textile a layer of the composition of a copolymer of:

(I) an addition-polymerizable polyester having an average of from one to two olefinic double bonds in each molecule and being the condensation product of:

(A)

(1) an addition-polymerizable polybasic carboxylic acid, having a single polymerizable double bond and less than 36 carbon atoms (2) a saturated or aromatic polybasic carboxylic acid having no polymerizable double bonds, and (3) a polyol or (B)

(1)

a) an addition-polymerizable alcohol, b) half ester of a saturated alcohol and a dibasic unsaturated acid, or c) an addition-polymerizable polyol (2) a saturated or aromatic polybasic carboxylic acid having no polymerizable double bonds,

UNITED STATES PATENT OFFICE
CERTIFICATE OF CORRECTION

Patent No. 3,681,108      Dated August 1, 1972

Inventor(s) Sheldon N. Lewis and John J. Miller

It is certified that error appears in the above-identified patent and that said Letters Patent are hereby corrected as shown below:

(3) a polyol, and (4) optionally, an addition-polymerizable unsaturated polybasic carboxylic acid and (II) a vinyl monomer and curing the composition.

Signed and sealed this 7th day of May 1974.

(SEAL)
Attest:

EDWARD M.FLETCHER,JR.
Attesting Officer

C. MARSHALL DANN
Commissioner of Patents